(12) United States Patent
Scott et al.

(10) Patent No.: US 7,940,446 B2
(45) Date of Patent: May 10, 2011

(54) OPTICAL MODULATION

(75) Inventors: Andrew Maxwell Scott, Worcestershire (GB); Mark Edward McNie, Worcestershire (GB); Kevin Michael Brunson, Worcestershire (GB)

(73) Assignee: Qinetiq Limited (GB)

( * ) Notice: Subject to any disclaimer, the term of this patent is extended or adjusted under 35 U.S.C. 154(b) by 164 days.

(21) Appl. No.: 12/090,313

(22) PCT Filed: Oct. 19, 2006

(86) PCT No.: PCT/GB2006/003887
§ 371 (c)(1),
(2), (4) Date: Apr. 15, 2008

(87) PCT Pub. No.: WO2007/045875
PCT Pub. Date: Apr. 26, 2007

(65) Prior Publication Data
US 2008/0239457 A1    Oct. 2, 2008

(30) Foreign Application Priority Data

Oct. 19, 2005  (GB) .................................. 0521251.9

(51) Int. Cl.
*G02F 1/03* (2006.01)
(52) U.S. Cl. ...... 359/247; 359/290; 359/291; 359/212.2
(58) Field of Classification Search .................. 359/247
See application file for complete search history.

(56) References Cited

U.S. PATENT DOCUMENTS

| | | | |
|---|---|---|---|
| 5,838,484 A | 11/1998 | Goossen | |
| 6,323,982 B1 * | 11/2001 | Hornbeck | 359/224.1 |
| 6,600,591 B2 * | 7/2003 | Anderson et al. | 359/291 |
| 6,633,212 B1 * | 10/2003 | Ruan et al. | 335/78 |
| 2002/0015215 A1 | 2/2002 | Miles | |
| 2002/0101644 A1 | 8/2002 | Mei et al. | |
| 2004/0008396 A1 | 1/2004 | Stappaerts | |
| 2005/0219676 A1 * | 10/2005 | Kimura et al. | 359/238 |
| 2006/0215147 A1 | 9/2006 | Scott | |

FOREIGN PATENT DOCUMENTS

EP  0 035 299  9/1981

* cited by examiner

*Primary Examiner* — Jessica T Stultz
(74) *Attorney, Agent, or Firm* — McDonnell Boehnen Hulbert & Berghoff LLP

(57) ABSTRACT

An optical modulator comprising a spacing-controllable etalon having at least one sprung micro-mirror suspended above a substrate. At least one electrically insulating stop is provided between the micro-mirror and the substrate to avoid short-circuit when the micro-mirror is drawn towards the substrate by an applied voltage. An optical detector detects the time of arrival of a first laser pulse. A control circuit predicts from this an arrival time of the next incident laser pulse and, responsive to a control signal, either retains the micro-mirror in its pulled-down state held against the insulating stops or releases the micro-mirror at a time predicted to maximise or minimise the light transmitted through the modulator. After a time interval calculated to permit a predetermined number of mechanical oscillations, the micro-mirror is pulled back down onto the stops.

21 Claims, 8 Drawing Sheets

Displacement Magnitude 0.00  0.10  0.20  0.30  0.40

OPTICAL MODULATION

FIELD OF THE INVENTION

The present invention relates to apparatus, methods, signals, and programs for a computer for modulation of an optical signal and systems incorporating the same.

BACKGROUND TO THE INVENTION

The potential of free-space optical communication systems is well established as a means of providing high bandwidth data links between two points on a line of sight basis. Such systems are being considered for a number of applications, including as elements of communication links in metropolitan areas and for local area networks in open plan offices.

Co-pending patent application U.S. Ser. No. 10/483,738 (A. M. Scott et al.) discloses a dynamic optical reflector and interrogation system employing a combination of spacing-controllable etalon and a retro-reflector arranged to reflect light received via the etalon back through the etalon towards the light source.

Patent application US 2002/0101644A1 relates to a light modulation device and system for phase modulation of incident light. Patent application US 2004/0008396A1 is directed to a differentially-driven MEMS spatial light modulator which also effects phase-modulation of incident light. Neither of these patent applications discloses use of an etalon structure.

SUMMARY OF THE INVENTION

The present invention relates to a means of modulating an optical beam so that information is transmitted along the beam. It can be combined with a retro-reflector to make a communications device which is not required to generate an optical beam, but works passively by reflecting and modulating a beam that is incident upon it.

The present invention provides a modulator which may be used for controlling the intensity or phase of a beam (or beams) of light. It is based on a single element or an array of micro opto-electro-mechanical systems (MOEMS) mirror structures in which a micro-mirror is suspended above a substrate. This may be used in transmission for wavelengths where the substrate (for example silicon) is transmissive, and may be used in reflection for a substantially larger range of wavelengths for which the substrate and mirror material are weakly absorbing.

According to a first aspect of the present invention there is provided a modulator for modulating an optical signal, the modulator comprising a spacing-controllable etalon comprising at least one sprung micro-mirror suspended over a substrate, and further comprising a control circuit arranged, in operation, to apply an electrostatic force by means of a voltage between the micro-mirror and substrate whereby to displace the micro-mirror from its equilibrium position towards the substrate and to retain the micro-mirror in a position between its equilibrium position and the substrate.

In one embodiment the micro-mirror is retained in position between its equilibrium position and the substrate without the voltage being maintained after the micro-mirror has arrived in that position.

In one embodiment, the modulator further comprises at least one insulating stop located between the micro-mirror and the substrate whereby to prevent the micro-mirror and substrate from coming into contact when the voltage is applied. The micro-mirror may be held down onto the insulating stop by applying a 'holding' voltage.

In a further embodiment, above a threshold voltage the mirror moves such that it is in physical contact with one or more end stops. This threshold voltage is when the electrostatic force exceeds the mechanical restoring force due to the device displacement—a condition commonly known as "latch", "pull-in", or "pull-down". Additionally, incorporating one or more end stops enables a pre-defined offset between the mirror and the substrate to be defined when in the pull-down position. Advantageously, this offset may be designed to correspond to a low optical transmission state over a wide angular range.

The electrical control circuit may be arranged to reduce the voltage applied between micro-mirror and substrate whereby to release the micro-mirror from the pull-down position or to adjust the mirror height when not in the pull-down position. If the micro-mirror is in a vacuum then the mirror may oscillate mechanically so that the spacing between the micro-mirror and the substrate varies with time after the holding voltage is reduced below a predetermined threshold value.

The control circuit may be arranged to release the micro-mirror responsive to a time of arrival at the modulator of a laser pulse.

The modulator may such that, responsive to a control signal, the control circuit is arranged to release or not release the micro-mirror at successive times calculated to maximise or minimise transmission of incident light in successive pulses received from a remote laser source, whereby to modulate the transmitted pulses.

The control circuit may be further arranged to re-apply the voltage after a pre-determined time responsive to the time of release of the micro-mirror.

If the time at which the voltage is re-applied corresponds to a single mechanical oscillation of the mirror or an integer number of mechanical oscillations, then the mirror will be close to the substrate when the voltage is applied and the mirror will rapidly return to the hold down position.

The micro-mirror may be located in a volume of low atmospheric pressure, preferably substantially a vacuum.

If the micro-mirror is in a vacuum, then the mechanical motion will not be damped by the viscous drag of the air, and will respond at the speed determined by the mechanical oscillation of the mirror. At atmospheric pressure the viscous drag of the air will cause all motion to be substantially lower.

The modulator may also comprise an array of micro-mirrors in a close packed pattern, with all the micro-mirrors controlled to move at the same time and with the same motion. In this case the divergence of the beam emerging from the modulator may be determined by the size of the overall array and not by the size of a single micro-mirror.

The modulator may further comprise a retro-reflector arranged to retro-reflect light transmitted through the etalon back through the etalon. If the modulator comprises an array of micro-mirrors controlled to move in a coherent way, then the divergence of the beam retro-reflected by the retro-reflector may be determined by the size of the retro-reflector rather than by the size of the micro-mirrors themselves.

The invention also provides for a system for the purposes of communications which comprises one or more instances of apparatus embodying the present invention, together with other additional apparatus.

In particular, according to a further aspect of the present invention there is provided a system for optical communications comprising a modulator according to the first aspect.

The invention is also directed to methods by which the described apparatus operates and including method steps for carrying out every function of the apparatus.

The invention also provides for computer software in a machine-readable form and arranged, in operation, to carry out every function of the apparatus and/or methods. In this context the computer program is also intended to encompass hardware description code used to describe, simulate or implement chip and/or circuit layout used to implement the present invention.

The invention is also directed to novel signals employed in the operation of the invention.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Figure 1A:
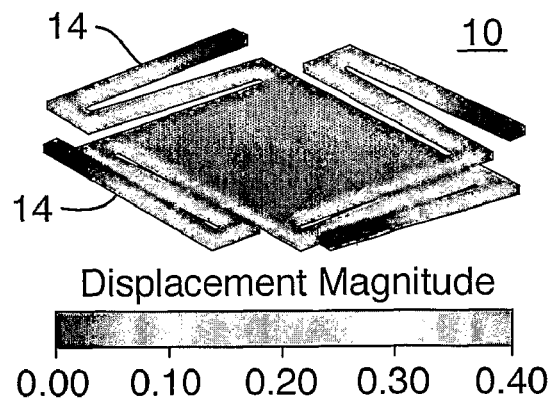
FIG. 1(a) shows a perspective view of a typical micro-mirror element and typical spring structures in accordance with the present invention (substrate not shown)
Figure 1B:
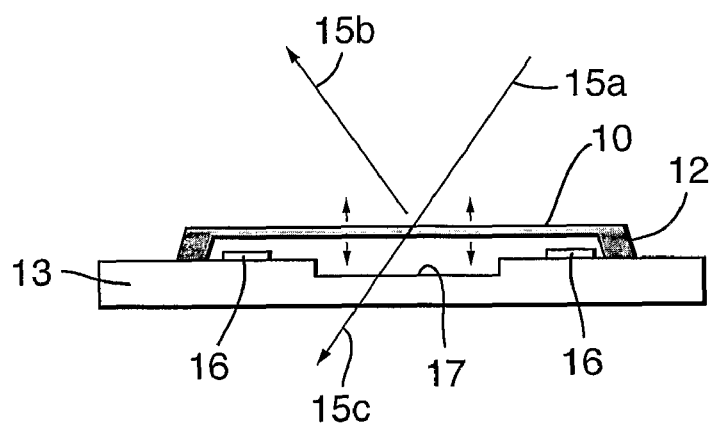
FIG. 1(b) shows a side view of the micro-mirror element and typical spring structures according to the present invention
Figure 1C:
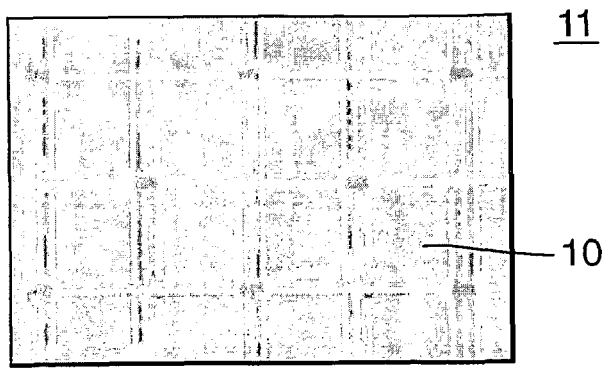
FIG. 1(c) shows a plan view of an array of micro-mirror elements according to the present invention.

Referring to FIGS. 1(a-c) a modulator that may be used for controlling the intensity of a beam (or beams) of light is based on a single element 10 or an array 11 of MOEMS mirror structures in which one or more micro-mirrors 10 are suspended 12 above a substrate 13. This arrangement may be used in transmission for wavelengths where the substrate (for example silicon) is optically transmissive, and may be used in reflection for a substantially larger range of wavelengths.

An individual element comprises a micro-mirror 10 which is suspended above a substrate 13 by a distance of between a fraction of a micron and a few microns. The micro-mirror is supported by springs 14, so that when a voltage is applied between the substrate and the micro-mirror, electrostatic forces will pull the micro-mirror from an equilibrium position (without voltage applied) towards the substrate.

In voltage-actuated electrostatic devices, below a given threshold the electrostatic force balances the mechanical restoring force due to the device displacement and the device is in a stable equilibrium condition. Above this threshold, the device becomes unstable as the electrostatic force exceeds the restoring force and the micro-mirror moves uncontrollably towards the substrate—a condition commonly known as "latch", "pull-in" or "pull-down". Applying a voltage above the threshold enables a larger range of mirror motion for a given drive voltage—typically by a factor of approximately 3 over a sub-threshold regime.

The micro-mirror may be any shape in plan form but is should be substantially flat and parallel to the substrate. The micro-mirror may conveniently be square but may also be of other shapes. Shapes which afford close packing in an array are particularly preferred: for example triangular, rectangular, and hexagonal.

When light 15a is directed onto this device, some of the light will be reflected 15b and some will be transmitted 15c to the substrate and out the other side (for the case of wavelengths such that the substrate is transparent). Light reflected and transmitted by the suspended mirror will interfere with light reflected and transmitted by the substrate, and the actual transmission and reflection of the device will vary between a high and a low value depending on the angle of incidence of the light upon the device, on the spacing between the suspended mirror and the substrate, and on other pre-determined characteristics of the system such as the thickness of the suspended micro-mirror, the refractive index of the material from which the micro-mirror is made, and the wavelength of the incident light.

In operation, as the spacing between micro-mirror and substrate changes, the transmission varies between a high and low value, providing a means of modulation of the incident light. The modulation can work in transmission or reflection modes. It is noted that the micro-mirror is typically a fraction of a micron thick and will be semi-transparent even in the visible region where silicon is highly absorbing, so a modulator made from silicon can be used in reflection for the visible band. Materials other than silicon, for example silicon dioxide or silicon nitride may also be used as would be apparent to the skilled person. In this case the substrate would be required to be transparent (and might for example be silicon dioxide or silicon nitride, and the micro-mirror and bottom layer would be silicon dioxide or silicon nitride or a thin layer of silicon or a combination of materials.

The transmission and reflection properties of the modulator can be described by using the known formulae for transmission and reflection by a Fabry-Perot etalon, as given in equation 2 of this document. It is noted that the reflected and transmitted light experiences a phase shift as well as a change in amplitude. This can also be used in a device which is required to modulate the phase of a beam of light.

When the micro-mirrors are produced as an array with an extended area covered by a tiling of closely packed mirrors, it becomes a Spatial Light Modulator (SLM). In an SLM the micro-mirrors may be controlled individually, in groups, or all together. Preferably the elements of the micro-mirror array are arranged or operated to move coherently: that is they are arranged to move synchronously with the same timing and amplitude, so that the resulting phase of light across the array is uniform; for the groups of multiple micro-mirrors, and possibly all, elements move together, to create a substantially uniform effect on parts of the wavefront incident upon the device. This has the benefit that the diffraction properties of the modulated light are determined by the extended wavefront and not by the diffraction by a single micro-mirror element. An array of small mirrors enables high speeds to be reached whilst maintaining good mirror flatness when compared to larger devices.

The micro-mirrors are each actuated between two stable positions in which one can be confident of ensuring the mirror is located when being controlled using two voltage states. The first of these is an 'equilibrium position' in which the micro-mirror 10 is suspended at rest above the substrate when no voltage (or a voltage below a given threshold) is applied between the mirror and the substrate. In embodiments in which no voltage is applied there is no extension of the support springs 14. In an alternative embodiment, a sub-threshold voltage is applied to reduce overall modulator power consumption by recharging a power cell when the state of the modulator is changed. The mirror will settle to a lower equilibrium position as the electrostatic and mechanical forces balance between the original equilibrium position (no voltage applied) and the substrate.

The second is the "pull-down" position in which the applied voltage exceeds the threshold, causing the micro-mirror to be pulled firmly down towards the substrate.

Insulating stops (for example bosses or other raised electrically insulating features) 16 may be provided between the substrate and the micro-mirror so that when the voltage exceeds the threshold value the mirror is pulled hard against the stops but cannot be pulled any further towards the substrate. These pull-down stops thereby prevent undesirable electrical contact between the micro-mirror and the substrate, since electrical contract would lead to a short circuit and electrical damage. Moreover, incorporating one or more end stops enables a pre-defined offset between the mirror and the substrate to be defined when in the pull-down position. Additionally, they provide mechanical damping, speeding the settling time. Advantageously, this offset may be specifically designed to correspond to a low transmission state over a wide angular range. Preferably the end stops are arranged to enable a small degree of bow to be built into the mirror in the pull-down position to provide additional energy to overcome any adhesion energy in the mechanical contact. In one possible embodiment, a substantially square or rectangular mirror incorporates end stops at or close to each corner of the mirror and at or close to the centre of the mirror.

The mirrors may be realised using a MEMS process, preferably a polysilicon surface micromachining process. Preferably, the end stops are realised using one or more bushes 16 (insulated islands) on the substrate and a dimple 17 under the mirror. More preferably the bushes may comprise silicon nitride and/or polysilicon and the mirror and dimple comprise polysilicon.

When a small voltage is applied to the micro-mirror, it will move a small amount from its equilibrium position. When the voltage exceeds a certain threshold, the motion becomes unstable, and the micro-mirror will snap down to the 'pull-down position'. It is difficult to apply an analogue control voltage to make the micro-mirror move to an arbitrary distance from the substrate, requiring fine control over the voltage and being susceptible to any voltage drops due to track length differences between mirrors in an array. In normal or simple control systems, one can only move the micro-mirror about one third of the way between the equilibrium position and the pull-down position under analogue control; thereafter the micro-mirror will dynamically move fully to the pull-down position. In practice this snap-down position is preferred in the present invention in which it is preferred to switch the micro-mirror between the equilibrium position and the pull-down position using two discrete voltage states.

When the micro-mirror is subjected to a force resulting from an applied voltage signal, the motion is determined by the mechanical resonance frequency of the mirror and the damping effect of the atmosphere. The mirror together with its spring system behaves as a classical resonator, with a resonant frequency which can be determined by conventional commercially available software tools. The precise resonant frequency for a given arrangement will depend on the strength of the spring and the mass of the mirror and the degree of damping. For typical structures of, for example, two straight springs and a mirror size of 25 micron×25 microns, this resonant frequency may be of the order of 300 kHz. Larger mirrors may have substantially lower resonant frequencies. Devices with stiffer springs may have substantially higher resonant frequencies.

At atmospheric pressure and at pressures down to a few tens of millibar, air causes the motion of the micro-mirrors to be heavily damped, and the time taken to change between states is dominated by this damping process. At a pressure of a few millibar or less, the micro-mirror behaves as a high-Q resonator: that is, it moves in a strongly oscillatory manner. This oscillation is not exhibited when the mirror is pulled down and held against the pull-down stops since they provide mechanical damping, but is evident when the micro-mirror is released from its pull-down position by switching the applied voltage to zero (or otherwise below the threshold required to retain it in the pull-down position).

When a micro-mirror is released in a vacuum, it will spring up towards its equilibrium position, and subsequently oscillate about this position, returning to close to the pull-down position after each cycle. This may be very weakly damped, and the motion will then proceed in a very predictable fashion in which the amplitude and the frequency are relatively independent of the precise degree of vacuum or the absolute voltage that was used initially to hold the micro-mirror down.

The displacement of the micro-mirror above the substrate is given by:

$$x(t)=x_0-(x_0-x_1)\cos(\Omega t)\exp(-\beta t) \quad (1)$$

where x is the distance from the substrate to the micro-mirror, $x_0$ is the equilibrium position, $x_1$ is the pull-down position, t is the time from release of the micro-mirror, $\Omega$ is the resonant frequency, and, $\beta$ is the damping coefficient.

Figure 2:
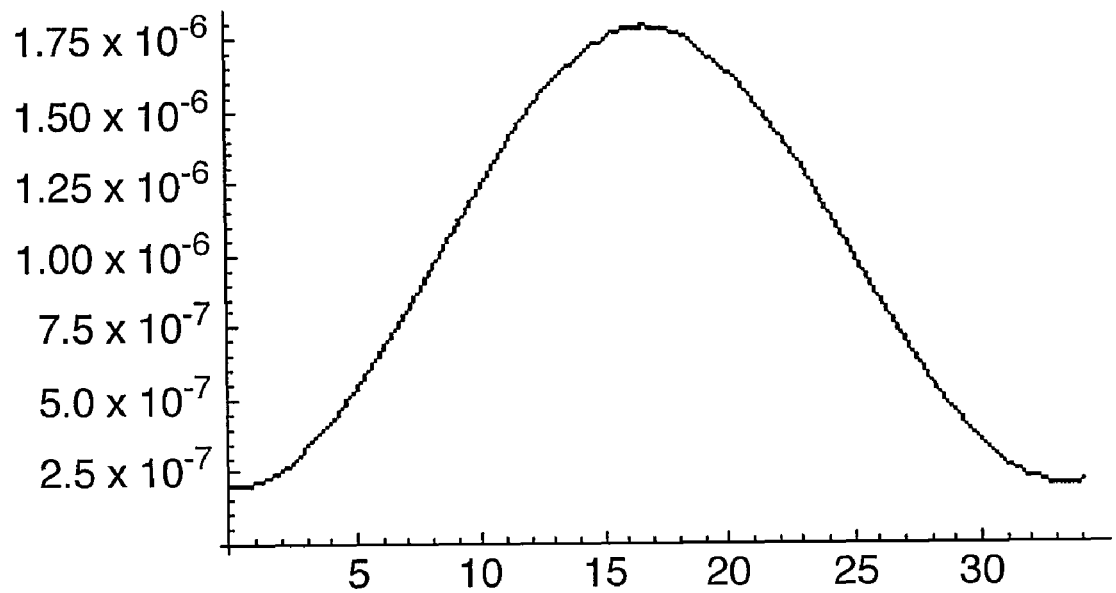
FIG. 2 shows a schematic graph of separation between micro-mirror and substrate versus time according to the present invention.

At low pressure the oscillation has a low damping coefficient and will exhibit an overshoot, so that for a maximum required plate separation (between micro-mirror and substrate) of 1.5 microns, for example, it is possible to design the equilibrium position to be close to 0.75 microns and rely on the overshoot to achieve the required maximum separation. The full range of plate separations is addressed in the first half cycle as the etalon moves from minimum to maximum separation from the substrate. After a time between a half period and a full period, the substrate voltage is reapplied, and as the plate continues the oscillation it moves back towards the substrate, where the micro-mirror is recaptured by the applied field and returns to the initial 'pull down' position. A typical plate separation with respect to time over one cycle is as shown in FIG. 2, in which the horizontal axis denotes time (in arbitrary units) and the vertical axis shows displacement of the micro-mirror from the substrate. The equilibrium position in the example shown is 1 micron. One may alternatively allow the micro-mirror to make a pre-determined number (1, 2, 3, or more) of oscillations and then re-apply the voltage to recapture the micro-mirror in the pull-down position.

By controlling the release timing of the micro-mirror in this way, control of the mirror position across the whole range of motion may be made dependent on timing control rather than fine voltage control. Such fine control of timing may be achieved using high speed digital electronics (e.g. 0.35 micron CMOS).

Figure 3A:
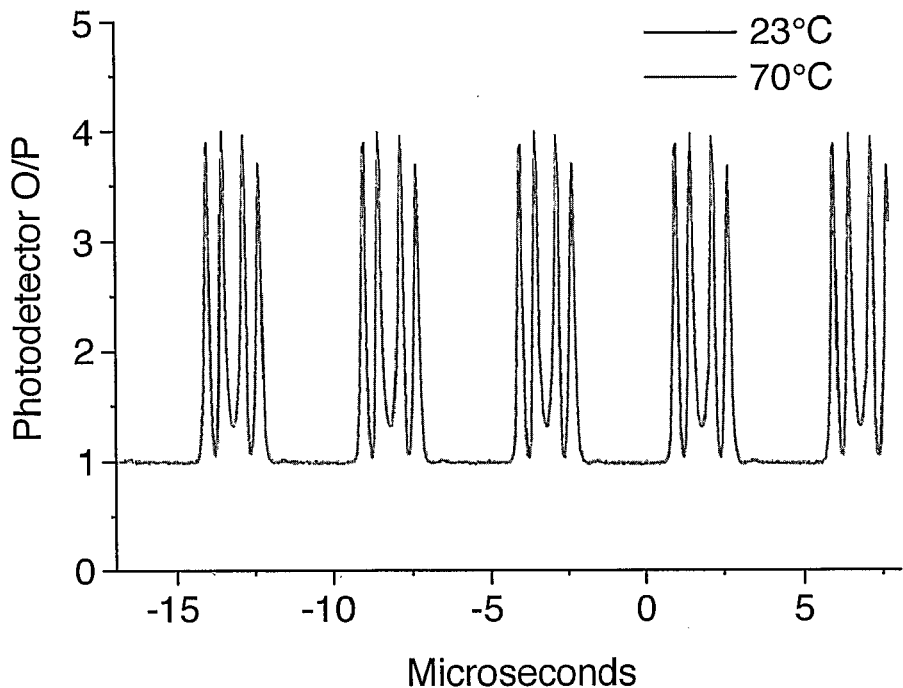
FIG. 3(a) shows a schematic graph of transmission characteristics of an optical modulator according to the present invention for a normal angle of incidence.
Figure 3B:
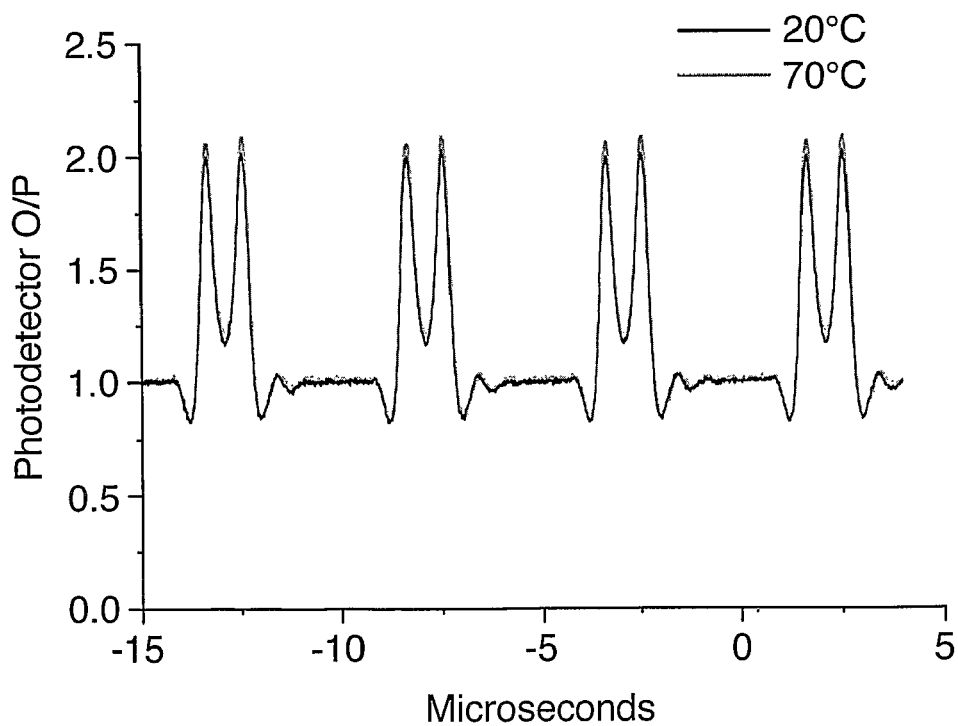
FIG. 3(b) shows a schematic graph of transmission characteristics of an optical modulator according to the present invention for a 60 degree angle of incidence.

Referring now to FIGS. 3(a) and 3(b), it is possible—using the formulae for transmission and reflection in a Fabry Perot etalon (equation 2 gives the transmission) in conjunction with the equation for the separation between micro-mirror and substrate over time—to determine the transmission through the micro-mirror versus time when the spacing of the etalon mirrors follows the time dependence as shown in FIGS. 3(a) and 3(b). FIG. 3(a) shows experimental transmission data for normal incidence whilst FIG. 3(b) shows the corresponding data for a 60 degree angle of incidence. Once again the horizontal axis denotes time whilst the vertical axis denotes optical transmission through the micro-mirror.

In the first example shown, for light incident normal to the plane of the etalon, two transmission peaks occur as the micro-mirror rises away from the substrate and a corresponding two peaks as it is drawn back towards the substrate. The second example shows that at 60 degrees there is one transmission peak as the micro-mirror moves to maximum displacement and a second as it returns to the pull down position. However the timing and number of peaks varies with angle of incidence of the light beam so that it is highly desirable to know the angle of incidence in order to optimise etalon timing. Each graph shows the transmission characteristics at two temperatures (of approximately 20 degrees and 70 degrees) showing a good degree of consistency between those two operating values.

Alternatively, measurements of the oscillation pattern may be used to determine the angle of incidence of light on the modulator. (In practice one derives a measurement of cos(θ), where θ is the angle of incidence)

This device may be used to control a continuous wave (cw) laser (or a laser with a predictable pulse pattern) providing that the detector system can resolve the dynamic modulation produced by the modulator. (FIGS. 9(b) and 9(c)). Alternatively it may be used to control a repetitively pulsed laser (FIG. 9(a)) providing that the pulse duration is substantially shorter than the oscillation period of the micro-mirror. In this case the detector in the interrogator system (new FIG. 10 or 9c) does not need to be able to resolve the dynamic behaviour of the modulator but only has to resolve the individual pulses of the interrogator. A timing circuit may be used, which may consist of a detector detecting arrival times of incident pulses, the timing of which is used to predict the precise arrival time of a subsequent pulse. The micro-mirror is held in the pull-down position and then may be released at a time calculated such that the micro-mirror system will be in a position to apply the desired amount of modulation to the pulse at the time the laser pulse is predicted to arrive.

Figure 4:
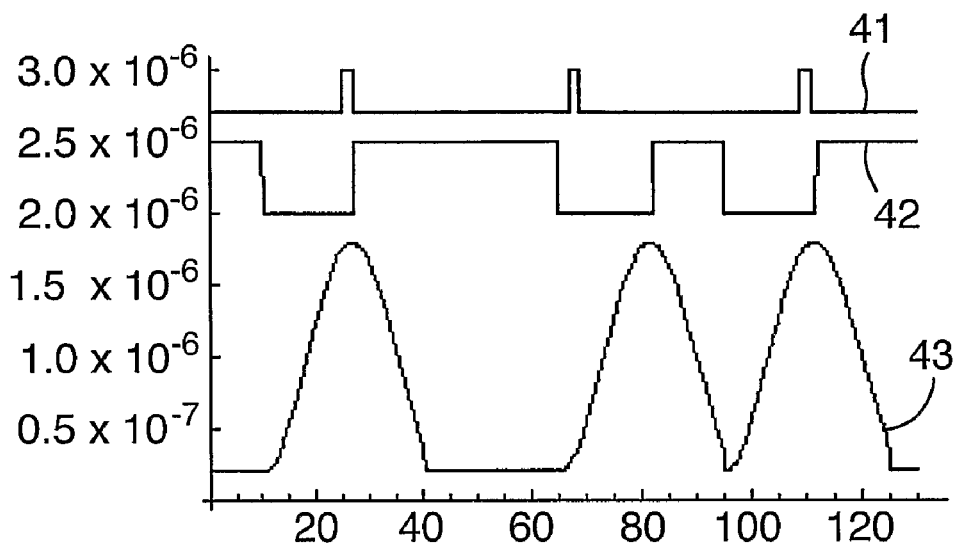
FIG. 4 shows a schematic graph of dynamic response over time of a modulator in accordance with the present invention.

Referring now to FIG. 4 the dynamic response of the etalon is shown versus time (clock pulses). The top trace 41 represents incoming laser pulses (arbitrary units); the middle trace 42 shows voltage applied to micro-mirror (pull-down voltage corresponds to "2.5×10$^{-6}$", 0V corresponds to "2×10$^{-6}$"), the bottom trace 43 shows spacing between substrate and MEOMS mirror (scale in metres).

If a laser pulse arrives near maximum displacement (first and third pulses) then transmission is maximum and logic 1 transmitted. If a laser pulse arrives when the mirror is close to the substrate (second pulse) then transmission is minimum and logic zero is transmitted.

Figure 5:
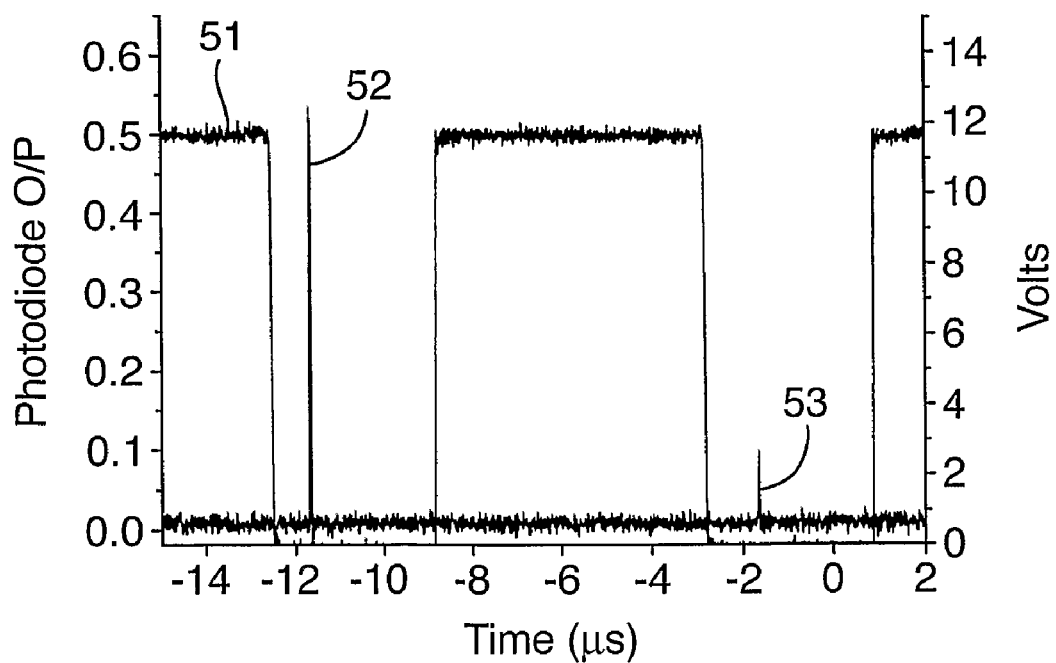
FIG. 5 shows a schematic graph comparing applied voltage with transmitted signal in accordance with the present invention.

Referring now to FIG. 5, experimental data is illustrated for the case in which trace 51 shows the micro-mirror drive voltage, and 52-53 show the transmitted power of two laser pulses. The delay between the release of the micro-mirror and the arrival of the first pulse is such that the transmission is high 52. The delay between the release of the micro-mirror and the arrival of the second pulse is such that the transmission is low 52.

Figure 9A:
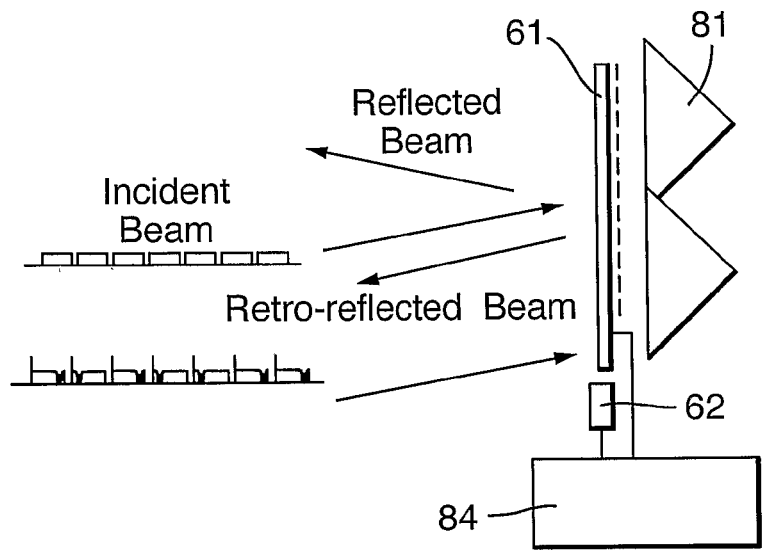
FIG. 9(a) shows a schematic diagram of a fourth modulator arrangement in accordance with the present invention incorporating a retro-reflector.
Figure 9B:
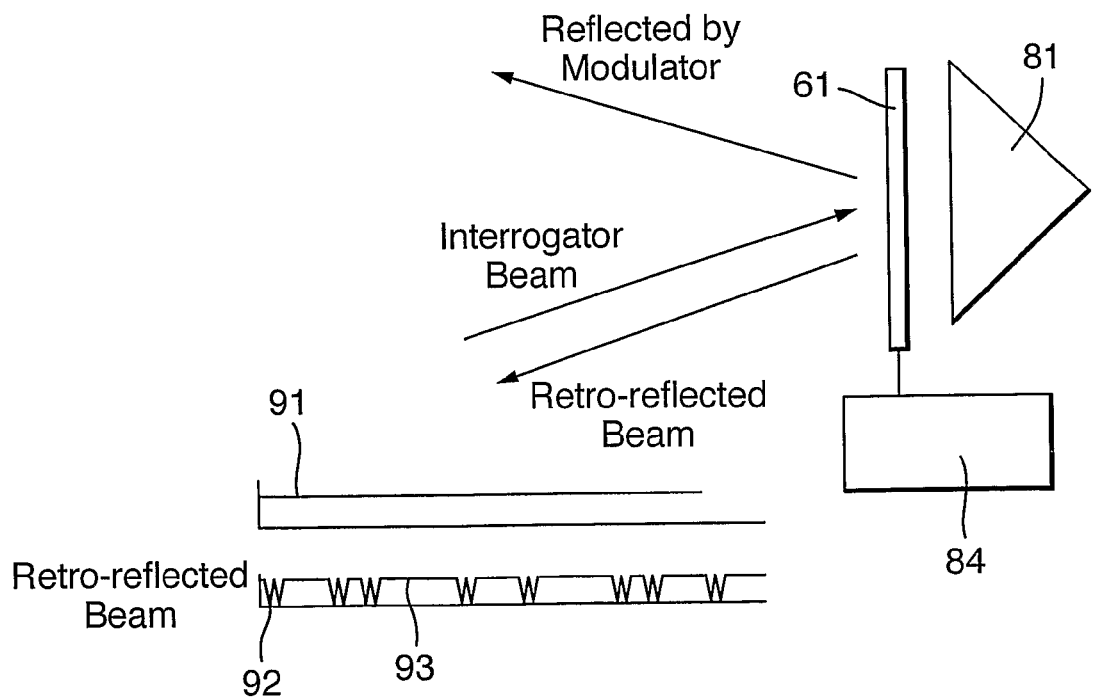
FIG. 9(b) shows a schematic diagram of a fifth modulator arrangement in accordance with the present invention incorporating a retro-reflector.
Figure 9C:
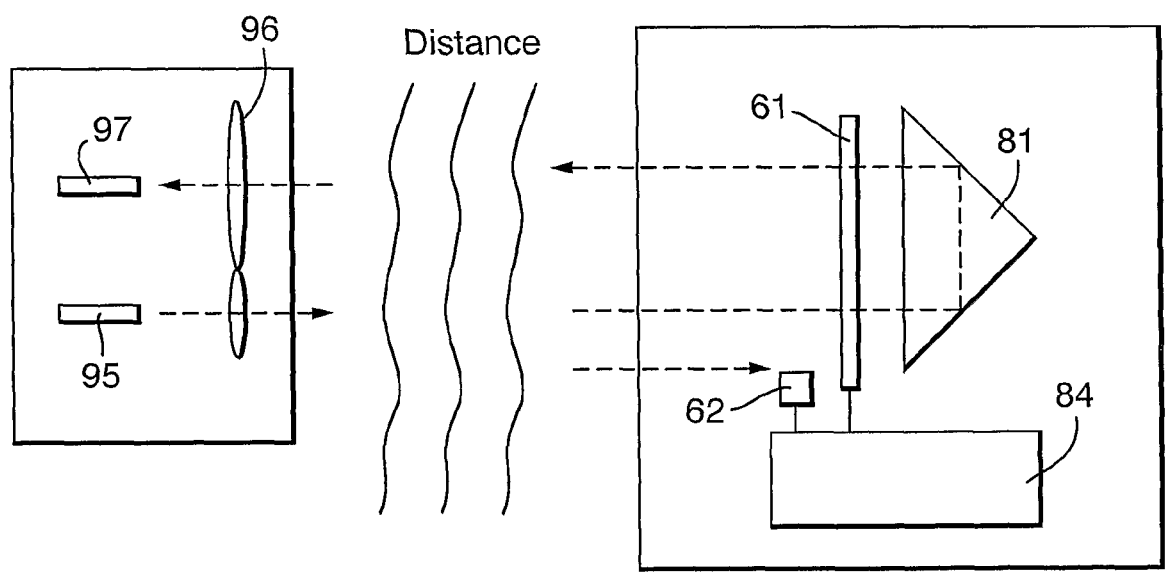
FIG. 9(c) shows a schematic diagram of a system in accordance with the present invention.

The modulator may be used with a retro-reflector, a detector and drive electronics to form a transponder that can communicate with a remote interrogator system as illustrated in FIG. 9(c). On the right the transponder is illustrated, while on the left, there is shown a laser 95 with a collimating lens 98, and a detector 97 with a collecting lens 96. If the transponder is sufficiently far away that light from the transponder diffracts and spreads so that it does not just return to the laser interrogator, but also spills over and passes into the receiver optics, then the detector will detect whatever light is reflected back from the transponder. In this case the interrogator will detect the modulation produced by the remote transponder.

The modulation imposed on the received pulses may be amplitude modulation, or phase modulation, or both together.

In a truly cw interrogator, the transponder may not need a detector and may simply transmit a modulating pattern for any interrogator to detect. It may alternatively use a detector to detect the presence of interrogator light. In a quasi-cw modulated interrogator, the transponder detector may use the timing information in the interrogator beam (e.g. intensity spikes or breaks in intensity) to synchronise the modulation with respect to the timing information. In the case of an interrogator producing a series of short pulses, then the transponder may detect the arrival of one pulse and use this timing information to determine the optimum timing to produce modulation of the next pulse. The optimum release time may be determined by, for example, detecting arrival of one pulse and collecting information on the angle of arrival, and then using a look-up table to determine the optimum delay. As an example, the system could be used to switch the transmission or reflection of the pulse between a maximum and a minimum value, or it may be used to control the amplitude of pulses so that they are all of the same intensity or so that they are coded in some way. One can do this in the first half cycle of the oscillation. One may alternatively do this at any predictable point during the mechanical oscillation, or one may even allow the micro-mirror to make two oscillations and achieve modulation of a pulse in the second oscillation (which is significant if one wishes to achieve full duplex communication).

Figure 6:
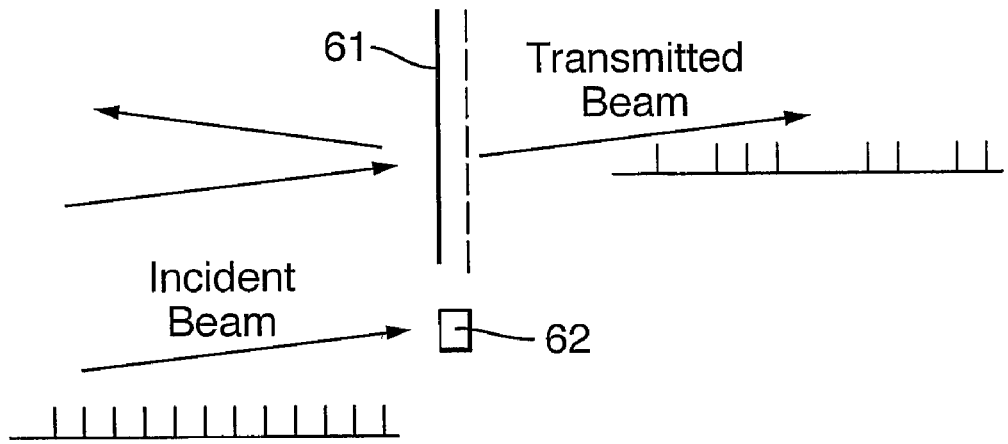
FIG. 6 shows a schematic diagram of a first modulator arrangement in accordance with the present invention.

Referring now to FIG. 6, the modulator 61 may therefore have a detector 62 associated with it so that it can detect the arrival of one pulse and use this information to release the micro-mirror in order to modulate the subsequent pulse.

Figure 7:
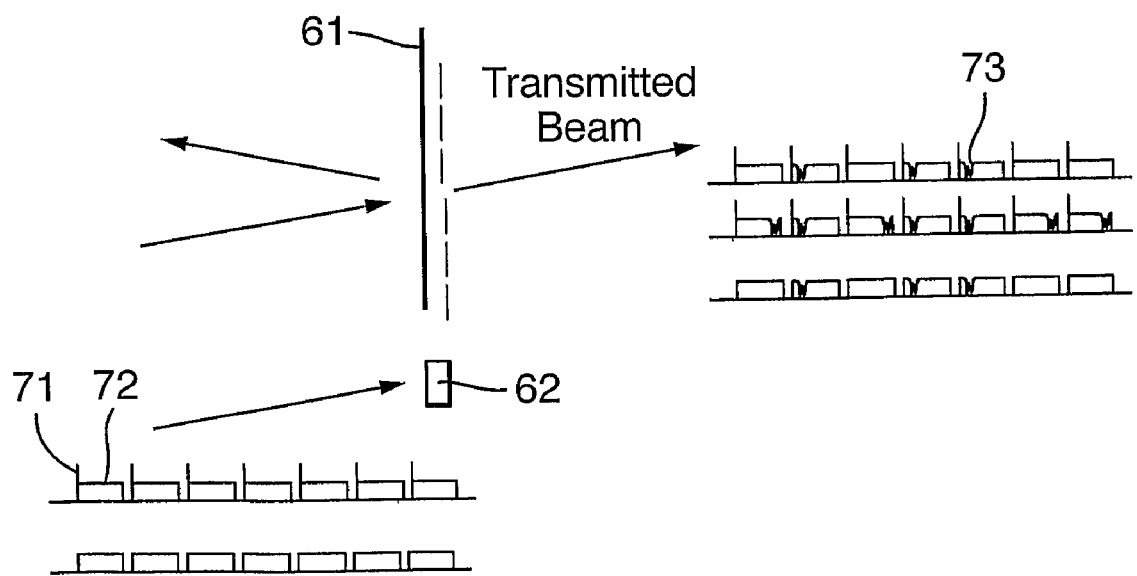
FIG. 7 shows a schematic diagram of a second modulator arrangement in accordance with the present invention.

Referring now to FIG. 7, in a variation of the above scheme the remote laser illuminator may consist of a repetitively short-pulsed laser system combined with a long pulse or continuous wave laser system. In this arrangement the short pulse may be used as a timing pulse. The modulator may use the short pulse for timing, and then impart a modulation on the continuous wave or long pulse part of the illumination. The modulated beam may then be encoded by, for example, a time shift of the modulation relative to the timing pulse. If the interrogator has a sufficiently fast detector or sensitive detector then it may not be necessary to have any timing information on the interrogator beam and no detector on the transponder. The interrogator detector may either detect the time resolved modulation, or may detect the small fast change ion the average retro-reflected power.

FIG. 7 schematically shows interrogation of a modulator 61 with a laser pulse comprising a timing pulse 71 and a quasi-cw laser pulse 72. The quasi-cw part is modulated 73; one can either code the beam by modulating or not modulating each pulse; or else one can choose to modulate or apply a time-delayed modulation. One can either use an initial timing pulse or one can use the rising edge of a rectangular-wave interrogation pulse (see examples lower left). Examples of the modulated pulses are shown middle right.

Figure 8:
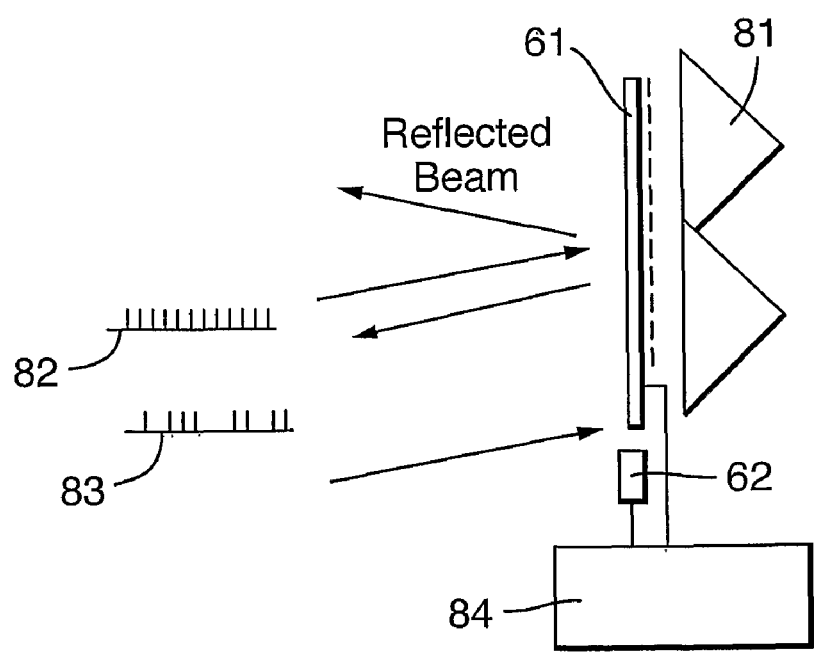
FIG. 8 shows a schematic diagram of a third modulator arrangement in accordance with the present invention incorporating of a retro-reflector.

Referring now to FIG. 8, the modulator 61 may be combined with a retro-reflector 81 and thereby act as a modulated retro-reflector. Whilst the modulator micro-mirror elements may, by way of example, be of the order of 25 μm across the elements of the retro-reflector may be considerably larger, for example 5-15 mm across. Providing the individual micro-mirrors move coherently, the divergence of light passing through the modulator will be determined by the overall array size and not by the divergence due to diffraction by a single micro-mirror. The use of relatively large retro-reflecting elements assists in forming a strongly collimated beam of reflected light. The modulated retro-reflector device may then be illuminated by a laser interrogator transmitting a pattern of pulses 82. The modulated retro-reflector device will then modulate the incoming pulses and retro-reflect the pulses 83 back to the interrogator. In this the interrogator pulses are essentially pulsed and the retro-reflected light is either wholly retro-reflected or wholly attenuated. The interrogator may then receive the retro-reflected pulses and decode them as a series of '1's and '0's. This modulator arrangement may use a detector 62 to detect pulses, and use a control unit 84 to predict the arrival time of subsequent pulses, using the detection of one pulse to determine the time to release a micromirror in order to modulate a subsequent pulse. In this case the angle of arrival on the retro-reflector will have to be controlled; alternatively the retro-reflecting system may use some form of angle detection to determine the optimum timing for the micro-mirror release.

Alternatively the combined system of interrogator and retro-reflecting modulator system may optimise performance. The modulator may be operated at a fixed time delay and the interrogator may determine the angle of arrival and vary the timing of pulses so that optimum modulation occurs.

The optimum timing for the modulator to produce a maximum or minimum signal will be angle dependent. If the above system is to work for light incident at any angle then the detector should preferably incorporate a means of determining the angle of arrival since optimum mirror timing depends upon angle of incidence of the incident light. Alternatively the interrogator may incorporate a means of estimating the angle of incidence on the tag and change the timing of pulses on the tag to ensure maximum modulation.

Referring now to FIGS. 9(a) and 9(b), alternatively one may use a modulated retro-reflector device together with an interrogator which may (or may not) transmit a set of short timing pulses together with quasi-continuous lower-intensity pulses. The modulating retro-reflector device may then modulate the quasi-continuous lower intensity pulse at some controlled time after the timing pulse. The device will retro-reflect this power back to the interrogator. In this arrangement the interrogator pulses comprise a modulation with a quasi CW period, and the retro-reflected light is synchronised with the pulsed element of the interrogator but the modulation is applied to the quasi-cw region of the interrogator illumination.

The precise modulation pattern received by the interrogator will depend on the angle of arrival on the retro-reflecting device, but the interrogator may be able to recognise the particular pattern and from this it will be able to determine the optimum time delay relative to timing pulse, and if desired, the angle of incidence.

By measuring the quasi-continuous waveform and its timing relative to the timing pulses, the interrogator will be able to determine the size of the time shift applied to the waveform, and hence interpret this as a piece of data. An advantage of this latter approach is that the modulator arrangement does not need to have an angle detector integrated into it, allowing it to be more compact and to be manufactured more cheaply.

Referring now to FIG. 9(b) the interrogator may produce a continuous illumination 91 and the retro-reflected light may then be modulated 92, 93 without synchronisation linked to the interrogator.

Referring now to FIG. 9(c) an overall system comprises a one or more modulator arrangements as described above together with an interrogator laser system, which incorporates a transmitter 95 and a receiver telescope 96 coupled to a detector 97.

In a first angle measurement mode, the interrogator transmits a continuous wave beam, and measures the retro-reflected light from the transponder. The transponder operates in a 'release and catch' mode, possibly without the use of any cue from the interrogator. For each 'release & catch' cycle, the retro-reflection detector will detect a signal qualitatively similar to that shown in FIG. 3, i.e. comprising a series of relatively well defined maxima and minima. By measuring over several pulses and integrating the detector will be able to accumulate a well-resolved curve. The timing of the peaks of these curves is a function of the cosine of the angle of incidence on the transponder, as is the depth or height of the central peak or trough, and by suitable fitting and processing of the data, it will be possible to determine the cosine of the angle of incidence on the modulator.

In a second embodiment of the angle measurement mode, the interrogator transmits a series of pulses and measures the retro-reflected light from the transponder. The transponder operates in a 'release and catch' mode, initiating the release time a fixed time delay after detecting a pulse from the interrogator. For each 'release & catch' cycle, the retro-reflection detector will detect a pulse from the transponder and it may record the amplitude of each pulse. If the interrogator slowly varies the timing between pulses so that the time delay between pulse N and pulse N+1 equals the time delay between pulse N−1 and pulse N plus some increment Dt, then each pulse will be modulated by a different part of the response curve of the modulator, and over a period of several pulses the interrogator will stroboscopically sample the whole transmission profile of the modulator. This data will enable the interrogator to infer the angle of incidence on the transponder.

In a first communication mode, the interrogator uses a train of pulses to interrogate the modulator arrangement. The modulator arrangement detects the timing of the incoming signal and the angle from an angle detector. From the time-history of the past set of pulses, the modulator arrangement is able to predict the arrival time of the next pulse. Using an internal clock and a look-up table it releases the micro-mirror array at such a time that the modulator provides a maximum or minimum transmission of the next pulse when it arrives.

Alternatively, minimum transmission may be obtained by simply holding the micro-mirrors in the pull-down position. The receiver detects pulses which it determines to be either logic 1 or logic 0. This mode will give performance over a maximum range.

In a second communication mode, the interrogator may (or may not) send a series of timing pulses (or a series of square pulses with sharp edges that can be used for timing purposes). This may be superimposed on a quasi continuous interrogation power. The modulator arrangement detects the timing of timing pulses, but does not attempt to determine the angle of arrival. It operates the 'release & catch' mechanism in one of two ways: it either modulates the pulse to indicate a logic one, and does not modulate to indicate a logic zero (or vice versa), or else it modulates at one of two preset time delays to indicate either logic one or logic zero. The advantage of the former is that a low bandwidth detector can detect modest changes in transmission which indicate whether or not modulation has been applied. The advantage of the latter technique is that it positively indicates detection of logic one and logic zero.

Alternatively, for true cw interrogation 91, one can detect either the presence 92 or absence 93 of modulation, or the presence of time-key shifted modulation, providing the interrogator can detect the modest change in signal strength that is expected if the signal integration time is slow compared with the high frequency components in the modulation signal.

The interrogator receives the timing pulse and the analogue return. Irrespective of the angle of arrival it is able to recognise the timing of the analogue return by reference to the retro-reflected timing pulse.

In a remote angle detection mode the goal is to determine the angle of incidence on a remote modulator arrangement. This may be useful for determining, for example, in which direction an interrogator should move in order to maximise the signal from the modulator arrangement, or to determine the orientation of the modulator. The interrogator illuminates the modulator with a quasi cw beam and detects the time resolved retro-reflection when the micro-mirrors are released and caught. By matching the detected signal to a template, the processor can identify the template corresponding to a particular angle of incidence.

In an intensity stabilisation mode, the goal is to stabilise the average of an output beam when the input beam is fluctuating on a timescale which is slow compared with the repetition rate (for example owing to scintillation). The incident power is incident on a modulator which is synchronised to provide a particular degree of attenuation. When there are fluctuations in the incident power, small timing changes can be made to the release time of the micro-mirrors so that the attenuation is adjusted, thereby ensuring that the overall laser power is maintained at a constant value If the incoming beam is, for example, a string of logic 1 and logic 0 pulses, with a more slowly varying intensity fluctuation caused by scintillation, then the system could be modulated so that the slowly varying fluctuation was removed by the stabilisation, but the more rapid variation between logic 1 and logic 0 remained and could be detected later. This approach may be used in place of a detector with a large dynamic range in order to detect the signal in a free-space optical laser communications system.

In a spatial light modulator mode, then groups of micromirrors on an array are released so as to produce a spatial pattern across the beam. This may be used for various applications where other spatial light modulators are currently used, including for example signal processing and beam steering.

In a beam steering mode, if one controls the release time of each individual element then one can effectively control the phase on each element of the micro-mirror array. By controlling the phase of each element, the propagation direction can be controlled. Thus this may be used to steer a laser beam in a predetermined direction, provided each micro-mirror can be individually controlled.

Considering the characteristics of the Fabry-Perot etalon in more detail, the transmission of the MOEMS mirror-substrate modulator may be modelled by considering the system as a simple structure with two reflecting surfaces, the reflection coefficient being determined by the Fresnel reflection equations applied to silicon. The transmission of a Fabry Perot etalon is given by:

$$T_{etalon} = \frac{T^2}{(1-R)^2} \frac{1}{1 + \frac{4R}{(1-R)}\sin^2\left(\frac{\phi}{2}\right)}; \quad (2)$$

$$\text{where } \phi = \frac{4\pi}{\lambda} L\cos\theta$$

in which the spacing between the plates is given by L, the angle of incidence is given by $\theta$ and the wavelength is $\lambda$. The reflectivity of each surface is given by R and the transmission is given by T.

If we consider the combination of the modulator and a corner cube retro-reflector, then we note that the reflected light will be determined by the combination of the two polarisation components. We consider the case where the interrogator is circularly polarised or depolarised, so that there are equal intensities of the two polarisations, whatever the angle of arrival. The incident light will have equal amounts of 's' (E vector parallel to surface) and 'p' polarised light (E vector in plane of transmitted and reflected beams). Each polarisation is transmitted by different amounts, and the part polarised beam enters the corner cube retro-reflector. This will become depolarised by a variable amount, depending on the nature of the retro-reflector. If the corner cube retro-reflector is metal coated then the polarisation properties will be preserved. If it relies on dielectric materials it will be significantly depolarised for certain angles. In the latter case it is assumed as an approximation that the beam is fully depolarised by the corner cube. The depolarised beam makes a second pass back through the etalon and returns to its source.

Thus the modulated retro-reflection is taken to be $$C_{retro} = \frac{(T_s + T_p)^2}{4} R_{cc} \quad (3)$$

where $C_{retro}$ is the component of the retro-reflection, $T_s$ and $T_p$ are the transmission for the s and p polarisations respectively and $R_{cc}$ is the reflectivity of the corner cube.

It is noted in passing that the phase $\psi$ of the transmitted light is given by the relation:

$$\psi = \text{Arg}\left\{\frac{1}{1 - R\exp(i\phi)}\right\}; \quad (4)$$

$$\text{where } \phi = \frac{4\pi}{\lambda} L\cos\theta$$

Figure 10:
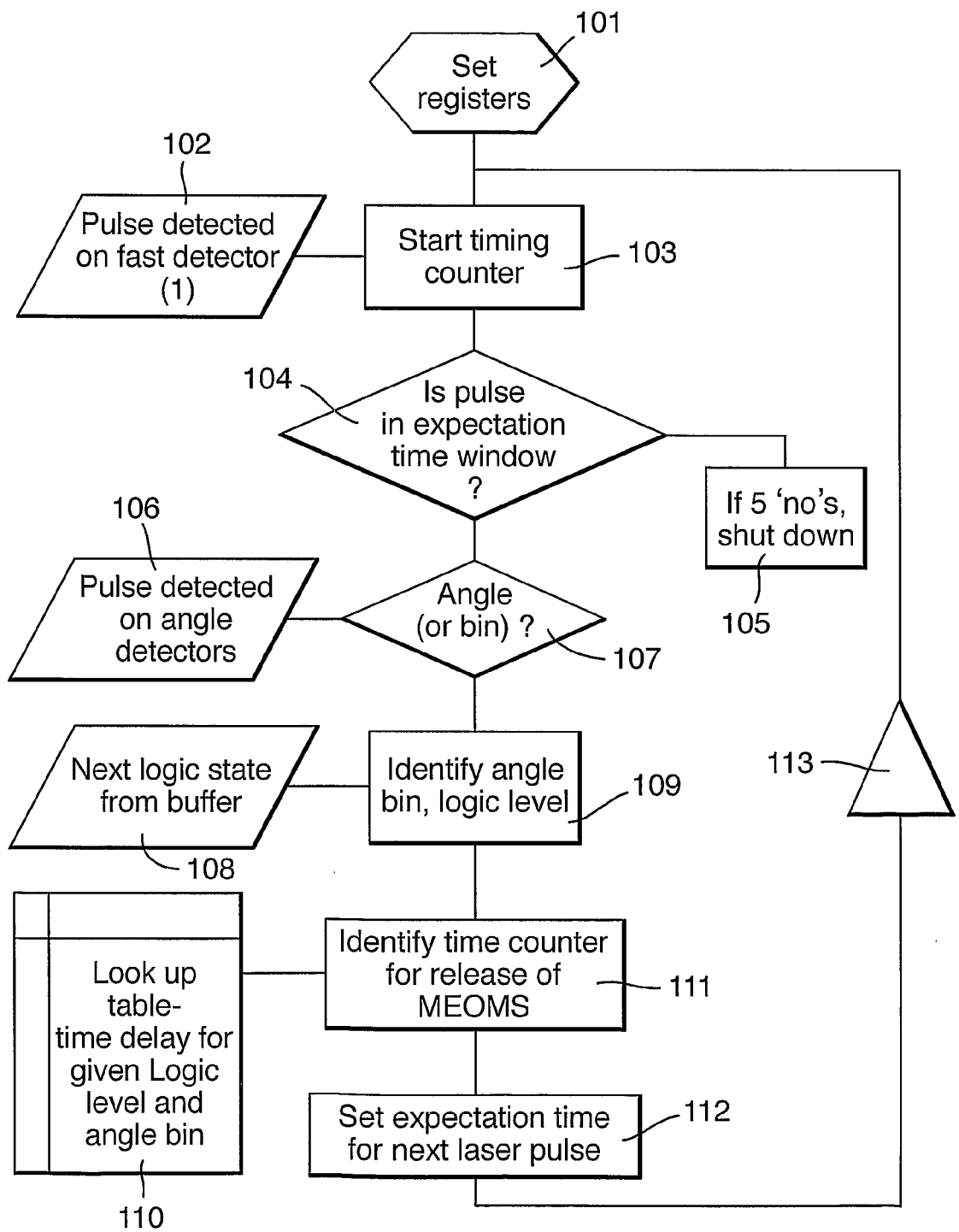
FIG. 10 shows a flow chart of a modulation method in accordance with the present invention.

Referring now to FIG. 10, there is shown a logic diagram for control of a modulator micro-mirror. Local registers are initialised 101 and when a timing pulse is detected 102 the timing counter is started 103. If the pulse arrives in the expectation time window 104 then the angle or angle range (or angle range or "bin") is determined 106-109. A release time for the micro-mirror 111 and expected arrival time for the next pulse 112 are then determined responsive to the established angle of incidence. This may conveniently make use of a look-up table 110. The process is then repeated 113 for the new expectation window. If the modulator repeatedly fails to receive pulses in the expectation window then it may terminate 105 or take other appropriate action.

Any range or device value given herein may be extended or altered without losing the effect sought, as will be apparent to the skilled person for an understanding of the teachings herein.

The invention claimed is:

1. A modulator for modulating an optical signal, the modulator comprising a spacing-controllable etalon comprising at least one sprung micro-mirror suspended over a substrate, at least one insulating stop located between the micro-mirror and the substrate and further comprising a control circuit arranged, in operation, to apply a voltage between the micro-mirror and substrate whereby to displace the micro-mirror from its equilibrium position towards the substrate into a snap-down state in which the sprung micro-mirror is retained in contact with the at least one insulating stop and in which, responsive to a control signal, the control circuit is arranged to release or not release the micro-mirror at successive times calculated to maximise or minimise transmission through the etalon of incident light in successive pulses received from a remote laser source, whereby to modulate the transmitted pulses.

2. A modulator according to claim 1 in which the electrical control circuit is arranged to reduce the voltage applied between micro-mirror and substrate whereby to release the micro-mirror.

3. A modulator according to claim 1 in which the control circuit is arranged to release the micro-mirror responsive to a time of arrival at the modulator of a laser pulse.

4. A modulator according to claim 1 in which the control circuit is further arranged to re-apply the voltage after a pre-determined time responsive to the time of release of the micro-mirror.

5. A modulator according to claim 1 in which the micro-mirror is located in a volume of low atmospheric pressure, preferably substantially a vacuum.

6. A modulator according to claim 1 further comprising a retro-reflector arranged to retro-reflect light transmitted through the etalon back through the etalon.

7. A modulator for modulating an optical signal the modulator comprising a plurality of a spacing-controllable etalons each comprising at least one sprung micro-mirror suspended over a substrate, at least one insulating stop located between the micro-mirror and the substrate, and further comprising a control circuit arranged, in operation, to apply a voltage between respective micro-mirrors and the substrate whereby to displace the micro-mirrors from their equilibrium positions towards the substrate into a snap-down state in which the sprung micro-mirror is retained in contact with the at least one insulating stop and in which, responsive to a control signal, the control circuit is arranged to release or not release the micro-mirror at successive times calculated to maximise or minimise transmission through the etalon of incident light in successive pulses received from a remote laser source, whereby to modulate the transmitted pulses.

8. A modulator according to claim 7 in which the plurality of spacing-controllable etalons are arranged in an array.

9. A modulator according to claim 7 in which the plurality of spacing-controllable etalons are partitioned into distinct areas each of which is separately controllable whereby, in operation, to impress a spatial pattern on light transmitted through the modulator.

10. A modulator according to claim 9 in which the spatial pattern is characterised by at least one of phase and intensity of transmitted light.

11. A spatial light modulator comprising a modulator according to claim 1.

12. A modulator according to claim 7 comprising an array wherein groups of etalons are controlled separately so as to produce a spatial pattern on the transmitted beam, causing the array to behave as a spatial light modulator.

13. A modulator according to claim 7 further comprising a retro-reflector arranged to retro-reflect light transmitted through the etalon back through the etalon.

14. A modulator according to claim 12 in which the retro-reflector comprises at least one retro-reflective element and in which a plurality of spacing-controllable etalons is located in front of at least one such retro-reflective element.

15. A system for optical communications comprising a modulator according to claim 1.

16. A system according to claim 15 in which the optical signal is a continuous wave signal.

17. A method of modulating light, the method comprising:
receiving incident light at a surface of a spacing-controllable etalon comprising at least one sprung micro-mirror suspended over a substrate and at least one insulating stop located between the micro-mirror and the substrate, and
applying a voltage between the micro-mirror and substrate whereby to displace the micro-mirror from its equilibrium position towards the substrate into a snap-down state in which the sprung micro-mirror is retained in contact with the at least one insulating stop and in which, responsive to a control signal, the control circuit is arranged to release or not release the micro-mirror at successive times calculated to maximise or minimise transmission through the etalon of incident light in successive pulses received from a remote laser source, whereby to modulate the transmitted pulses.

18. A method according to claim 17 in which the incident light is in the infrared spectrum (1 μm-15 μm wavelengths).

19. A modulator according to claim 1 in which communication is achieved by switching or not switching the micro-mirrors, and a detector detects the presence or absence of modulation.

20. A modulator according to claim 1 in which communication is achieved by switching the micro-mirrors at different times to achieve logic one or logic zero, and a detector detects the presence or absence of modulation.

21. A modulator according to claim 1 in which the at least one insulating stop is dimensioned such that the snap-down state corresponds to a low optical transmission state of the etalon with respect to the optical signal.

* * * * *